United States Patent
Yun et al.

(10) Patent No.: US 12,277,649 B2
(45) Date of Patent: Apr. 15, 2025

(54) METHOD AND SYSTEM FOR PROVIDING AUTOMATED 3D MODELING FOR XR ONLINE PLATFORM

(71) Applicant: RECON Labs Inc., Seoul (KR)

(72) Inventors: Kyungwon Yun, Seoul (KR); Sergio Bromberg Dimate, Seoul (KR); Leonard Yoon, Seoul (KR); Seonghoon Ban, Seoul (KR)

(73) Assignee: RECON Labs Inc., Seoul (KR)

( * ) Notice: Subject to any disclaimer, the term of this patent is extended or adjusted under 35 U.S.C. 154(b) by 218 days.

(21) Appl. No.: 18/084,766

(22) Filed: Dec. 20, 2022

(65) Prior Publication Data

US 2023/0196673 A1  Jun. 22, 2023

(30) Foreign Application Priority Data

Dec. 20, 2021 (KR) .................. 10-2021-0183116
Feb. 28, 2022 (KR) .................. 10-2022-0025930

(51) Int. Cl.
*G06T 17/20* (2006.01)
*G06T 7/50* (2017.01)
(Continued)

(52) U.S. Cl.
CPC ............... *G06T 17/20* (2013.01); *G06T 7/50* (2017.01); *G06T 7/70* (2017.01); *G06V 10/751* (2022.01);
(Continued)

(58) Field of Classification Search
CPC . G06T 17/20; G06T 7/50; G06T 2207/10016; G06T 7/55;
(Continued)

(56) References Cited

U.S. PATENT DOCUMENTS

2017/0085733 A1* 3/2017 Ilic .................... H04N 13/271
2017/0357406 A1* 12/2017 Yi ......................... G06T 17/20
(Continued)

FOREIGN PATENT DOCUMENTS

| JP | 2015135672 S | 7/2015 |
| KR | 1020200061281 A | 6/2020 |
| KR | 1020200137323 A | 12/2020 |

OTHER PUBLICATIONS

Ben Mildenhall, et al., "NeRF: Representing Scenes as Neural Radiance Fields for View Synthesis", arXiv:2003.08934v2, Computer Vision and Pattern Recognition, Aug. 3, 2020. (Year: 2020).*
(Continued)

*Primary Examiner* — King Y Poon
*Assistant Examiner* — Nayana Yeshlur
(74) *Attorney, Agent, or Firm* — Dinsmore & Shohl LLP; Yongsok Choi, Esq.

(57) ABSTRACT

A method for providing an XR object is provided, which is executed by one or more processors, and includes receiving a plurality of images obtained by capturing an image of a target object positioned in a specific space from different directions, generating an XR object for the target object based on the plurality of images, generating a code for applying the XR object to an online platform, and transmitting the code to a first user terminal.

9 Claims, 12 Drawing Sheets

(51) Int. Cl.
*G06T 7/70* (2017.01)
*G06V 10/75* (2022.01)

(52) U.S. Cl.
CPC ............... *G06T 2207/10024* (2013.01); *G06T 2207/20081* (2013.01)

(58) Field of Classification Search
CPC .......... G06T 2207/20084; G06T 15/08; G06T 19/20; G06V 10/751; G06V 20/20; G06Q 30/0641
See application file for complete search history.

(56) References Cited

U.S. PATENT DOCUMENTS

2019/0045157 A1* 2/2019 Venshtain ........... G06F 3/04815
2021/0335052 A1 10/2021 Jeong

OTHER PUBLICATIONS

"Welcome to Display.land" Nov. 18, 2019 https://medium.com/ubiquity6/welcome-to-display-land-5f0014cb5d51 (Year: 2019).*
Asktoby, "Turn any object into a Stream VR home in less than 5 minutes", Feb. 29, 2020, https://www.youtube.com/watch?v=KY-c4cbaOtM (Year: 2020).*
Ben Mildenhall, et al., "NeRF: Representing Scenes as Neural Radiance Fields for View Synthesis", arXiv:2003.08934v2, Computer Vision and Pattern Recognition, Aug. 3, 2020.

* cited by examiner 710   720

METHOD AND SYSTEM FOR PROVIDING AUTOMATED 3D MODELING FOR XR ONLINE PLATFORM

CROSS-REFERENCE TO RELATED APPLICATIONS

This application claims priority to Korean Patent Application No. 10-2021-0183116 and No. 10-2022-0025930, filed in the Korean Intellectual Property Office on Dec. 20, 2021, and Feb. 28, 2022, respectively, the entire contents of which are hereby incorporated by references.

BACKGROUND

Field

The present disclosure relates to a method and a system for providing an XR object, and specifically, to a method and a system for generating an XR object based on a plurality of images obtained by capturing a target object and generating and providing code for applying the generated XR object to an online platform.

Description of Related Art

In the related art, to produce a 3D model of an object, a 3D modeling work is generally performed using a program such as CAD. Since a certain level of skill is required to perform these work, most of the 3D modeling work was performed by experts. Accordingly, there is a problem that the 3D modeling work is time and cost consuming, and the quality of the produced 3D model varies greatly according to the operator.

Recently, a technology for automating 3D modeling based on photographies or video of a target object captured from various angles has been introduced, making it possible to produce a 3D model within a short time. While general techniques for automating general 3D modeling involve the process of extracting feature points from the image, this method has a problem in that, depending on the features of the object, the feature points are not properly extracted, or a 3D model is generated, which does not faithfully reflect the shape of the object.

In addition, in order to provide the end user with a 3D model or XR object for the product provided on the online platform, the operator or manager of the online platform needs to prepare or purchase separate software and apply it to the online platform, but it requires a lot of time and cost to prepare or purchase the separate software.

SUMMARY

In order to solve the problems described above, the present disclosure provides a method for, a non-transitory computer-readable recording medium storing instructions for, and an apparatus (system) for providing an XR object.

The present disclosure may be implemented in a variety of ways, including a method, an apparatus (system), or a non-transitory computer-readable recording medium storing instructions.

A method for providing an eXtended Reality (XR) object is provided, which may be executed by one or more processors include receiving a plurality of images obtained by capturing an image of a target object positioned in a specific space from different directions, generating an XR object for the target object based on the plurality of images, generating a code for applying the XR object to an online platform, and transmitting the code to a first user terminal.

The method may further include receiving, from a second user terminal, a first request to view the XR object through the online platform to which the code is applied, and transmitting data associated with the XR object to the second user terminal.

The XR object may be a digital object including 3D information on the target object, and the second user terminal may use data associated with the XR object to virtually place the XR object on an image of a real space captured by a camera or on an image of a virtual space and display the result on a display.

The method may further include receiving, from a second user terminal, a first request to view the XR object through the online platform to which the code is applied, in response to receiving a first request to view the XR object, determining whether or not it is necessary to change a device to view the XR object, in response to determining that it is necessary to change the device, transmitting a visually coded pattern for viewing the XR object to the second user terminal, and receiving a second request to view the XR object from a third user terminal that captured the visually coded pattern.

The generating the XR object for the target object may include estimating a position and a pose of capturing each of the plurality of images, training a volume estimation model based on the plurality of images and the position and pose at which each image is captured, and generating a 3D model of the target object by using the volume estimation model.

The volume estimation model may be a model trained to receive position information and viewing direction information in a specific space and output color values and volume density values.

The volume estimation model may be trained to minimize a difference between the pixel value included in a plurality of images and the estimated pixel value calculated based on color value and volume density value estimated by the volume estimation model.

The generating the 3D model of the target object may include generating a 3D depth map of the target object by using the volume estimation model, generating a 3D mesh of the target object based on the generated 3D depth map, and applying texture information on the 3D mesh to generate the 3D model of the target object.

There may be provided a non-transitory computer-readable recording medium storing instructions for executing the method on a computer.

An information processing system may include a communication module, a memory, and one or more processors connected to the memory and configured to execute one or more computer-readable programs included in the memory, in which the one or more computer-readable programs may include instructions for receiving a plurality of images obtained by capturing an image of a target object positioned in a specific space from different directions, generating an XR object for the target object based on the plurality of images, generating a code for applying the XR object to an online platform, and transmitting the code to a user terminal.

By training a volume estimation model and using the trained volume estimation model to generate an XR object, it is possible to generate a high-quality 3D model that implements the shape and/or texture of the target object accurately and precisely.

Since it is possible to estimate color values and volume density values for all positions and viewing directions within a specific space where the target object is positioned, a high-resolution, precise and accurate depth map can be generated, and a high-quality 3D model or XR object can be generated based on the same.

By performing a process of transforming an image into an undistorted image in the process of generating the 3D depth map, a precise and accurate 3D depth map can be generated.

In the process of generating a 3D model based on the 3D depth map, by performing the process of inversely transforming the 3D depth map, it is possible to implement a realistic 3D model or XR object that makes the user viewing a 3D model through a user terminal feel as if he or she is capturing a real object with a camera.

It is possible to provide a code for applying the XR object to the online platform, and accordingly, without having to develop separate software for providing the XR objects, the operator or manager of the online platform can provide the end user with the user experience of experiencing the XR object by applying the provided code to the online platform.

The XR object is virtually placed on the image of the real space captured by the camera or on the virtual space and displayed on the display, thereby providing the user experience such that the user feels as if the target object is placed in the real space captured by the camera.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
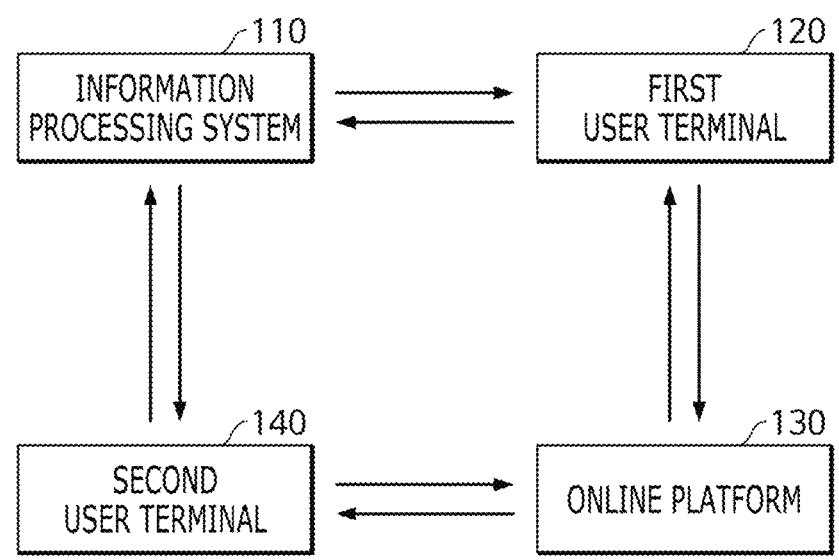
FIG. 1 is a diagram illustrating an example of a system for providing an XR object.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. The machine learning model may include an artificial neural network model including an input layer, a plurality of hidden layers, and an output layer, where each layer may include a plurality of nodes. In the present disclosure, the machine learning model may refer to an artificial neural network model, and the artificial neural network model may refer to the machine learning model. In the present disclosure, "volume estimation model" may be implemented as a machine learning model. In some examples of the present disclosure, a model described as one machine learning model may include a plurality of machine learning models, and a plurality of models described as separate machine learning models may be implemented into a single machine learning model.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

In the present disclosure, an "online platform" may be a web-based platform (e.g., an online shopping mall web site), an application (e.g., an online shopping mall application), or a platform on an extended reality (XR) (e.g., a shopping mall platform on virtual reality, and the like), through which users can view and purchase products online.

In some examples of the present disclosure, "a plurality of images" may refer to a video including a plurality of images, and the "video" may refer to a plurality of images included in the video.

FIG. 1 is a diagram illustrating an example of a system for providing an XR object. An information processing system 110 may receive, from a first user terminal 120 (e.g., a terminal of an operator or manager of an online platform 130), a video (or a plurality of images included in the video) of an object (hereafter, "target object") that is a target for which an XR object is generated and generate/construct/reconstruct an XR object for the target object. The XR object for the target object may be a digital object including 3D information on the target object. For example, the XR object may include a 3D model of the target object, and additionally include a description of each part of the target object, a moving 2D/3D animation, or the like. A 3D model of the target object may be generated by 3D modeling based on a plurality of images obtained by capturing the target object.

For example, the information processing system 110 may estimate position and pose of capturing each of a plurality of received images, train a volume estimation model based on the plurality of images and the position and pose of capturing each of the images, and generate/construct a 3D model for the target object using the trained volume estimation model, thereby generating an XR object for the target object. A method of the information processing system 110 for generating the XR object for the target object based on a plurality of images will be described in detail below with reference to FIGS. 5 and 6.

The information processing system 110 may generate a code for applying the generated XR object to the online platform 130 and transmit the generated code to the terminal requesting to generate the XR object, i.e., to the first user terminal 120. The code for applying the XR object to the online platform 130 may refer to a code applied to the online platform 130 so as to allow a user terminal accessing the online platform 130 to perform tasks associated with the XR object, such as viewing XR objects, outputting XR objects, and the like. For example, the code for applying the XR object to the online platform 130 may include a code for outputting a preview of the XR object to a second user terminal 140 (e.g., the terminal of the user of the online platform 130, and the like) connected to the online platform 130, and a code for outputting an XR object or a button, a link, a visually coded pattern (e.g., QR code), or the like for viewing the preview of the XR object to the second user terminal 140. The code may refer to a code written in a language applicable to the online platform 130. For example, if the online platform 130 is a web-based platform, the code may include a code written in a language such as Javascript or the like, a binary of the code, an HTML tag for loading the code, and the like. As another example, if the online platform 130 is a platform in augmented reality, it may include software produced in the form of a plug-in or the like that can load XR objects on the corresponding platform.

A first user (e.g., an operator or manager of the online platform 130, and the like) may apply the code received through the first user terminal 120 to the online platform 130 to provide an XR object to users of the online platform 130.

A second user (e.g., a user of the online platform 130) may access, through the second user terminal 140, the online platform 130 to which the code is applied to view the XR object. For example, in response to an input of the second user requesting to view the XR object through the online platform 130 to which the code is applied, the second user terminal 140 may transmit a request to view an XR object to the information processing system 110 and the information processing system 110 may transmit data associated with the XR object requested for viewing to the second user terminal 140. The second user terminal 140 may use data associated with the received XR object to virtually place an XR object on an image of a real space captured by a camera (or an image sensor, and the like) or on an image of a virtual space and display the result on a display. Through this, it is possible to provide the user experience such that the user feels as if the target object is disposed in the real space captured by the camera or in the virtual space.

According to the method for generating an XR object of the present disclosure, instead of extracting feature points from an image and generating a 3D model based on the same, the method may train a volume estimation model and use the trained volume estimation model to generate a 3D model, thereby implementing the shape and/or texture of the target object accurately and precisely.

In addition, according to the method for providing an XR object of the present disclosure, because the information processing system 110 provides relevant data if the user of the online platform 130 requests to view the XR object through the online platform 130 to which the code is applied, without having to develop or apply separate software for providing a 3D model or XR object, the operator or manager of the online platform 130 can provide users with the user experience of viewing the XR object.

Figure 2:
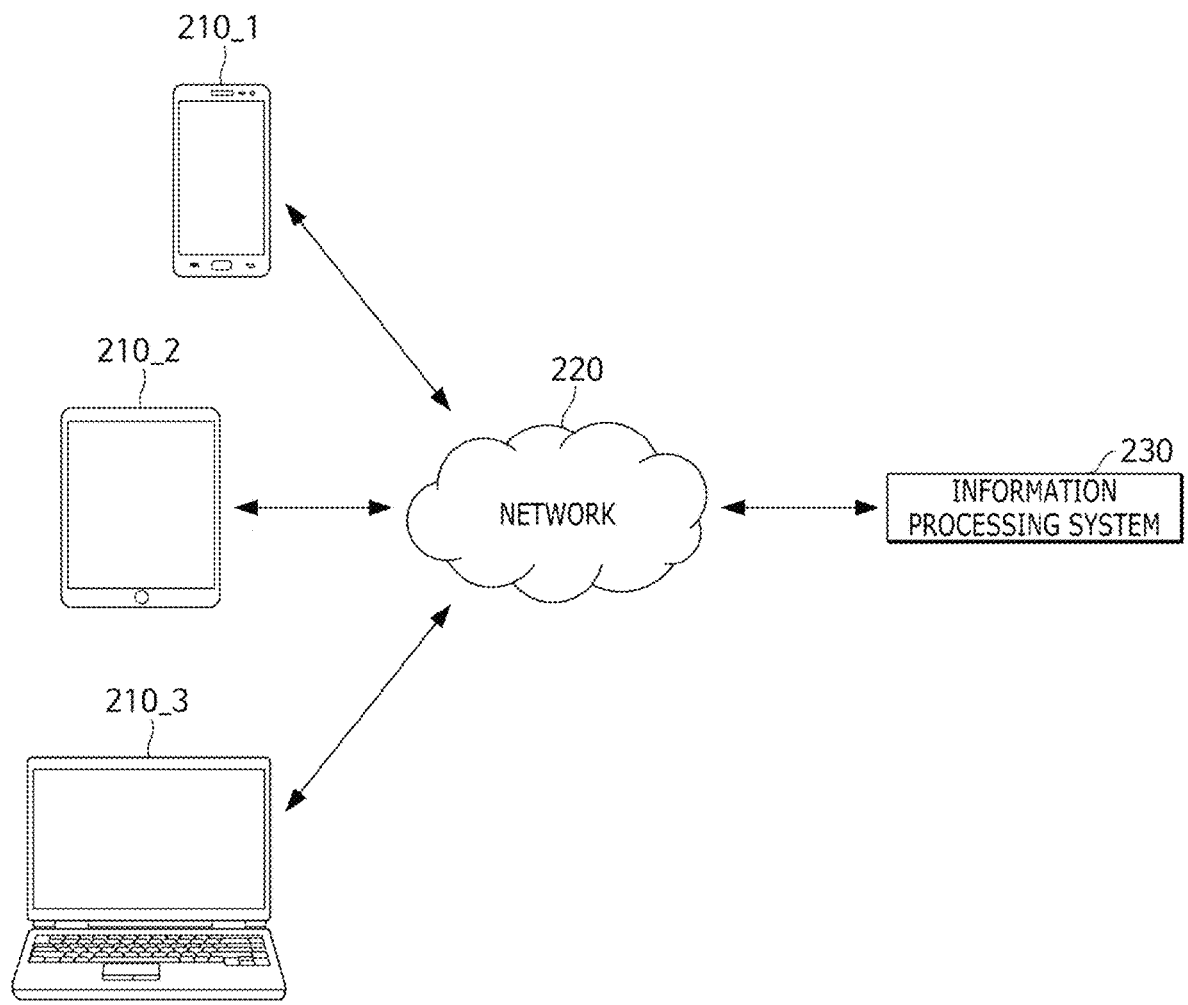
FIG. 2 schematically illustrates a configuration in which an information processing system is communicatively connected to a plurality of user terminals.

FIG. 2 schematically illustrates a configuration in which an information processing system 230 is communicatively connected to a plurality of user terminals 210_1, 210_2, and 210_3. As shown, through a network 220, the plurality of user terminals 210_1, 210_2, and 210_3 may be connected to the information processing system 230 that is capable of providing an XR object providing service, a 3D modeling service, and the like. In this example, the plurality of user terminals 210_1, 210_2, and 210_3 may include a terminal of a user (e.g., an online platform operator/manager or an online platform user) to be provided with an XR object providing service and the like. In an embodiment, the information processing system 230 may include one or more server devices and/or databases, or one or more distributed computing devices and/or distributed databases based on cloud computing services that can store, provide and execute computer-executable programs (e.g., downloadable applications) and data relating to the XR object providing service, and the like.

The XR object providing service provided by the information processing system 230 may be provided to the user through an XR object generation application installed in each of the plurality of user terminals 210_1, 210_2, and 210_3, a 3D modeling application, an online platform application, a shopping application, a mobile browser application or a web browser, and the like. For example, the information processing system 230 may provide corresponding information or perform a corresponding process, in response to a request to generate or view an XR object for the target object received from the user terminals 210_1, 210_2, and 210_3 through a web browser or the like.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminals, but are not limited thereto, and the user terminals 210_1, 210_2, and 210_3 may be any computing device that is capable of wired and/or wireless communication and that can be installed with an XR object generation application, a 3D modeling application, an online platform application, a shopping application, a mobile browser application, or a web browser, and so on and execute the same. For example, the user terminal may include an AI speaker, a smart phone, a mobile phone, a navigation, a computer, a nootbook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, while FIG. 2 illustrates that three user terminals 210_1, 210_2, and 210_3 are in communication with the information processing system 230 through the network 220, aspects are not limited thereto, and a different number of user terminals may be configured to be in communication with the information processing system 230 through the network 220.

The information processing system 230 may receive, from the user terminals 210_1, 210_2, and 210_3, a plurality of images obtained by capturing a target object from different directions. The information processing system 230 may generate an XR object for the target object based on the plurality of images received in this way, generate a code for applying the XR object to the online platform, and provide the code to the user terminals 210_1, 210_2, and 210_3 (e.g., the user terminal of the online platform operator or manager, an online platform management system, and the like). Additionally or alternatively, the information processing system 230 may receive a request to view an XR object through the online platform to which the code is applied, and provide data associated with the XR object to the user terminals 210_1, 210_2, and 210_3 (e.g., a user terminal of a user of the online platform).

Figure 3:
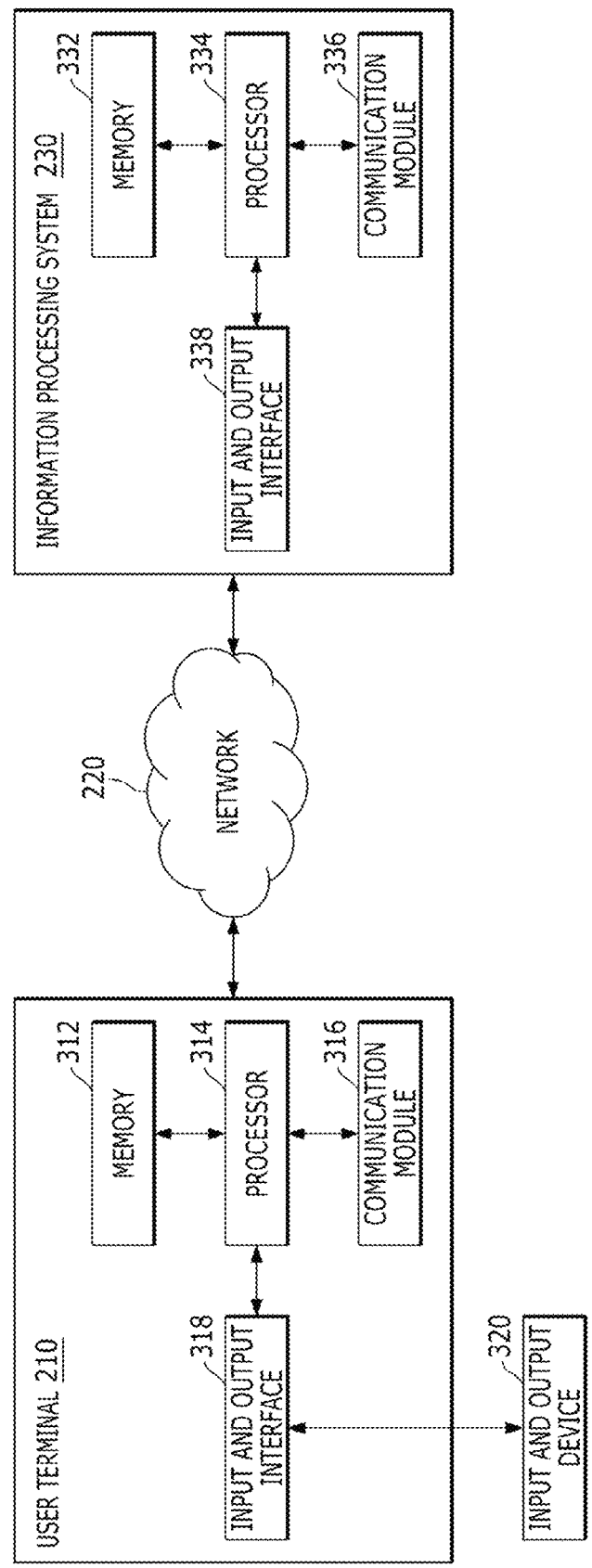
FIG. 3 is a block diagram of an internal configuration of the user terminal and the information processing system.

FIG. 3 is a block diagram of an internal configuration of the user terminal 210 and the information processing system 230. The user terminal 210 may refer to any computing device that is capable of executing the XR object generation application, the 3D modeling application, the online platform application, the shopping application, the mobile browser application or the web browser, and so on, and also capable of wired or wireless communication, and may include the mobile phone terminal 210_1, the tablet terminal 210_2, and the PC terminal 210_3 of FIG. 2, and so on, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for an XR object generation application, and the like installed in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in the recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to generate an XR object, a request to view an XR object, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive, from the information processing system 230 and through the communication module 316, a code for applying the generated XR object to the online platform, data associated with the XR object for viewing the XR object, and the like.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded into the memory 312, and a service screen or the like, which is configured with the information and/or data provided by the information processing system 230 or another user terminals, may be displayed on the display via the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210. The processor 314 of the user terminal 210 may be configured to operate an XR object generation application or the like. A code associated with the application and/or program may be loaded into the memory 312 of the user terminal 210.

While a program for the XR object generation application or the like is being operated, the processor 314 may be configured to receive text, image, video, audio, and/or action, and so on inputted or selected through the input device such as a camera, a microphone, and so on, that includes a touch screen, a keyboard, an audio sensor and/or an image sensor connected to the input and output interface 318, and store the received text, image, video, audio, and/or action, and so on in the memory 312, or provide the same to the information processing system 230 through the communication module 316 and the network 220. For example, the processor 314 may be configured to receive an input indicating that the user selects a video (or a plurality of images) or the like obtained by capturing a target object and provide the same to the information processing system 230 through the communication module 316 and the network 220. As another example, the processor 314 may be configured to receive a user input requesting to generate an XR object and provide the same to the information processing system 230 through the communication module 316 and the network 220. As another example, the processor 314 may be configured to receive a user input requesting to view an XR object and provide the same to the information processing system 230 through the network 220 and the communication module 316.

The processor 314 of the user terminal 210 may be configured to manage, process, and/or store the information and/or data received from the input device 320, another user terminal, the information processing system 230 and/or a plurality of external systems. The information and/or data processed by the processor 314 may be provided to the information processing system 230 via the communication module 316 and the network 220. The processor 314 of the user terminal 210 may be configured to transmit the information and/or data to the input and output device 320 via the input and output interface 318 to output the same. For example, the processor 314 may be configured to display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 via the communication module 336 and the network 220. The processor 334 of the information processing system 230 may be configured to generate an XR object for the target object based on a plurality of images obtained by capturing the target object and received from the user terminal 210, and generate a code for applying the generated XR object to the online platform, and provide the generated code to the user terminal 210 through the communication module 336 and the network 220.

The processor 334 of the information processing system 230 may be configured to output the processed information and/or data through the output device 320 such as a device (e.g., a touch screen, a display, and so on) capable of outputting a display of the user terminal 210 or a device (e.g., a speaker) capable of outputting an audio. For example, the processor 334 of the information processing system 230 may be configured to provide data associated with the XR object to the user terminal 210 through the communication module 336 and the network 220, and output the XR object through a device capable of outputting a display, or the like of the user terminal 210.

Figure 4:
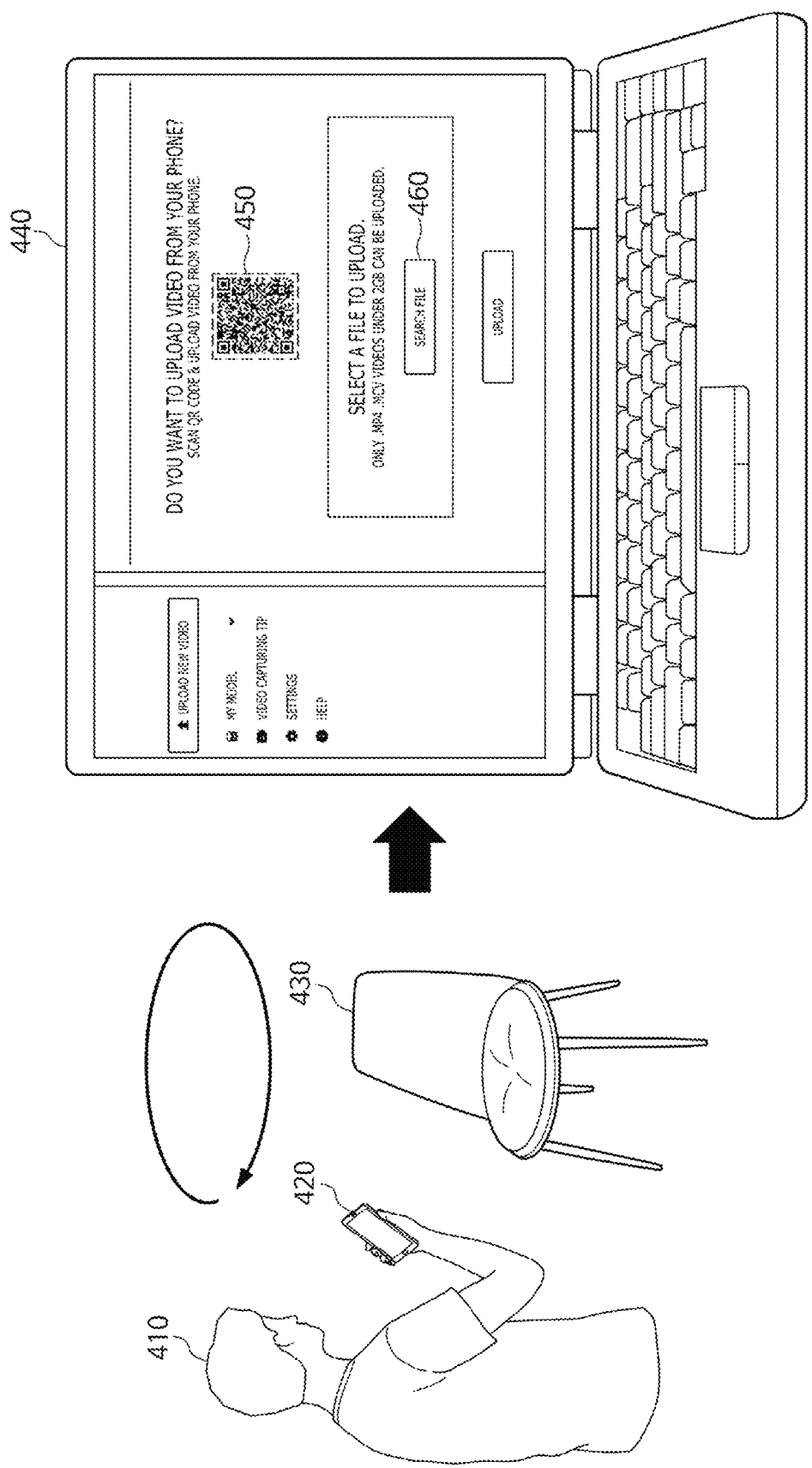
FIG. 4 is a diagram illustrating an example in which a user captures a target object from various directions using the user terminal and transmits a captured video (or a plurality of images) to the information processing system.

FIG. 4 is a diagram illustrating an example in which a user 410 captures a target object 430 from various directions using a user terminal 420 and transmits a captured video (or a plurality of images) to the information processing system. In order to request to generate an XR object for the target object 430, the user 410 (e.g., an operator or manager of an online platform) may transmit a plurality of images (or video) obtained by capturing the target object 430 from different directions to the information processing system. For example, while rotating around the target object 430, the user 410 may capture a video that includes the target object 430, using a camera (or an image sensor) provided in the first user terminal 420 (e.g., mobile phone terminal). The user 410 may transmit the captured video (or a plurality of images included in the video) to the information processing system. As a specific example, if the captured video is not stored in a second user terminal 440 (e.g., PC terminal), the user 410 may capture a visually coded pattern 450 (e.g., a QR code) output through the second user terminal 440 with the first user terminal 420 storing the captured video so that the video can be transmitted to the information processing system. As another specific example, if the captured video is stored in the second user terminal 440, the user may select a file search button 460 and select the video obtained by capturing the target object so as to transmit the video to the information processing system.

FIG. 4 illustrates an example in which the user 410 captures a video including the target object 430 with the mobile phone terminal 420 and uploads the video through the PC terminal 440, but aspects are not limited thereto. For example, in another example, the user 410 may upload the captured video directly from the user terminal 420 that captured the target object 430. In addition, while it is described in FIG. 4 that the information processing system receives a video or a plurality of images including the target object 430 from the user terminals 420 and 440, aspects are not limited thereto. For example, the information processing system may receive a plurality of images from an external system (e.g., an online platform management system, or the like) capable of communicating with the information processing system without going through the user terminal, or may receive a plurality of images from a memory included in the information processing system or a database accessible by the information processing system.

Figure 5:
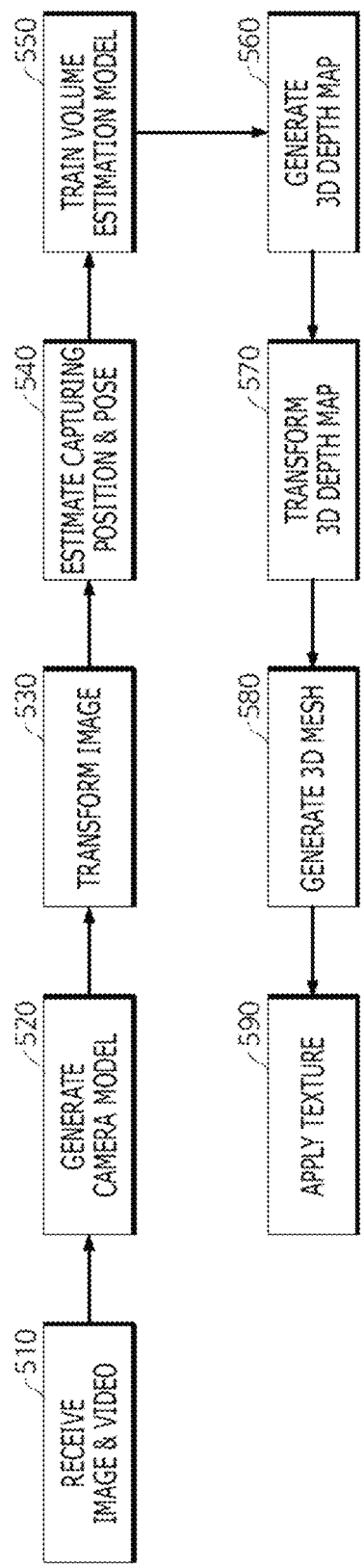
FIG. 5 is a diagram illustrating an example of a method for generating an XR object.

FIG. 5 is a diagram illustrating an example of a method for generating an XR object. First, the information processing system may receive a plurality of images that are obtained by capturing a target object positioned in a specific space from different directions, or receive a video obtained by capturing the target object from various directions, at 510. If the information processing system receives the video, the information processing system may acquire a plurality of images included in the video. For example, the information processing system may receive, from a user terminal (e.g., a terminal of an operator or manager of an online platform), a video obtained by capturing the target object while rotating around the same, and acquire a plurality of images from the video.

The information processing system may transform a plurality of images obtained by capturing the target object into undistorted images, in consideration of distortion of the camera that captured the target object. For example, the information processing system may estimate a camera model based on the plurality of images, at 520. Specifically, photogrammetry may be used to estimate the camera model that captured a plurality of images. The information processing system may use the estimated camera model to transform the plurality of images into undistorted images, at 530.

The information processing system may estimate position and pose of capturing each image, at 540. In this case, the "position and pose of capturing each image" may refer to the position and direction of the camera at the time point of capturing each image. In order to estimate the position and pose, various estimation methods for estimating the position and pose from the image may be used. For example, a photogrammetry technique of extracting feature points from a plurality of images and use the extracted feature points to estimate the position and pose of capturing each image may be used, but aspects are not limited thereto, and various methods for estimating the position and pose may be used. When a plurality of images are transformed into undistorted images, the information processing system may estimate the position and pose of capturing each image based on the plurality of transformed undistorted images. Alternatively, the information processing system may also estimate the position and pose of capturing each image based on the plurality of received (distorted) images, and, by using the camera model, correct and transform the estimated position and pose.

The information processing system may train the volume estimation model based on the plurality of images (a plurality of undistorted images, if the plurality of received images are transformed to undistorted images) and the position and pose of capturing each image, at 550. In this case, the volume estimation model may be a machine learning model (e.g., an artificial neural network model). The volume estimation model may be a model trained to receive position information and viewing direction information in a specific space and output color values and volume density values. For example, the volume estimation model may be expressed by the following equation.

$$F_\Theta:(x,\phi) \rightarrow (c,\sigma) \qquad \text{<Equation 1>}$$

where, F is the volume estimation model, $\Theta$ is the parameter of the volume estimation model, x and $\phi$ are the position information and viewing direction in a specific space, respectively, and c and $\sigma$ are the color value and volume density value, respectively. As a specific example, the color value c may represent the color value (e.g., RGB color value) seen if viewed in the viewing direction $\phi$ with respect to the position, and if viewed in the viewing direction $\phi$ with respect to position, the volume density value $\sigma$ may have a value of 0 if an object is not present, and may have any real value greater than 0 and less than or equal to 1 according to the transparency if an object is present (that is, the volume density may mean the rate that light is occluded). By using the trained volume estimation model, it is possible to estimate the color values and volume density values for any position and viewing direction in a specific space where the target object is positioned.

The volume estimation model may be trained to minimize a difference between a pixel value included in a plurality of images and an estimated pixel value calculated based on the color value and volume density value estimated by the volume estimation model. That is, a loss function may be defined based on a difference between the pixel value included in the image and the estimated pixel value calculated based on the color value and the volume density value estimated by the volume estimation model. For example, the loss function for training the volume estimation model may be expressed by the following equation.

$$\text{Loss} = \Sigma \|\hat{C} - C\|_2^2 \qquad \text{<Equation 2>}$$

where, C and $\hat{C}$ are a ground truth pixel value included in the image, and an estimated pixel value calculated based on the color value and volume density value estimated by the volume estimation model, respectively. A method for calculating the estimated pixel value $\hat{C}$ based on the color value and the volume density value estimated by the volume estimation model will be described in detail below with reference to FIG. 4.

After the training of the volume estimation model is completed, the information processing system may generate a 3D model of the target object by using the volume estimation model. The color value and volume density value for any position and viewing direction in the specific space in which the target object is positioned may be estimated using the trained volume estimation model, and accordingly, a 3D model of the target object may be generated by using the same.

In order to generate a 3D model of the target object, the information processing system may first generate a 3D depth map of the target object by using the volume estimation model, at 560. For example, if the specific space in which the target object is positioned is viewed at a specific position and specific pose, the distance to the nearest point having a non-zero volume density value may be estimated as the distance to the object. According to this method, the information processing system may generate a 3D depth map of the target object by using the volume estimation model. If the process of transforming the plurality of received images into undistorted images is performed, the 3D depth map may be transformed to a 3D depth map for the original (distorted) image using the camera model, at 570.

The information processing system may generate a 3D mesh of the target object based on the generated (or transformed) 3D depth map, at 580, and apply the texture information on the 3D mesh to generate a 3D model of the target object, at 590. The texture information herein may be determined based on the color values at a plurality of points and plurality of viewing directions in the specific space as inferred by the volume estimation model.

According to the related method, since the 3D model is generated based on the feature points commonly extracted from a plurality of images, if the number of feature points that can be extracted from a plurality of images is small, a sparse depth map is generated, and if a dense depth map is inferred from the sparse depth map, an incomplete depth map is generated due to loss of information. In contrast, by using the trained volume estimation model according to an example, it is possible to estimate the color values and volume density values for all positions and viewing directions in the specific space in which the target object is positioned, and accordingly, it is possible to directly generate a dense depth map. That is, according to the present disclosure, it is possible to generate a high-resolution, precise and accurate depth map. In addition, it is possible to use the image super resolution technology to further enhance the resolution of the depth map. As described above, by generating the 3D model using the high quality 3D depth map, it is possible to generate a high quality XR object close to the photorealistic quality.

In addition, by generating a 3D depth map by transforming the plurality of received images into undistorted images, it is possible to generate a precise and accurate 3D depth map, and by generating a 3D model by inversely transforming the generated 3D depth map, it is possible to implement a realistic XR object that makes the user viewing the XR object through the user terminal feel as if he or she is capturing a real object with the camera (camera with distortion).

The method for generating/constructing the 3D model described above with reference to FIG. 5 is merely one example, and the scope of the present disclosure is not limited thereto. For example, various method for generating/constructing various 3D models, such as generating a 3D model without going through a process of generating a depth map and the like, may be applied to the present disclosure.

Figure 6:
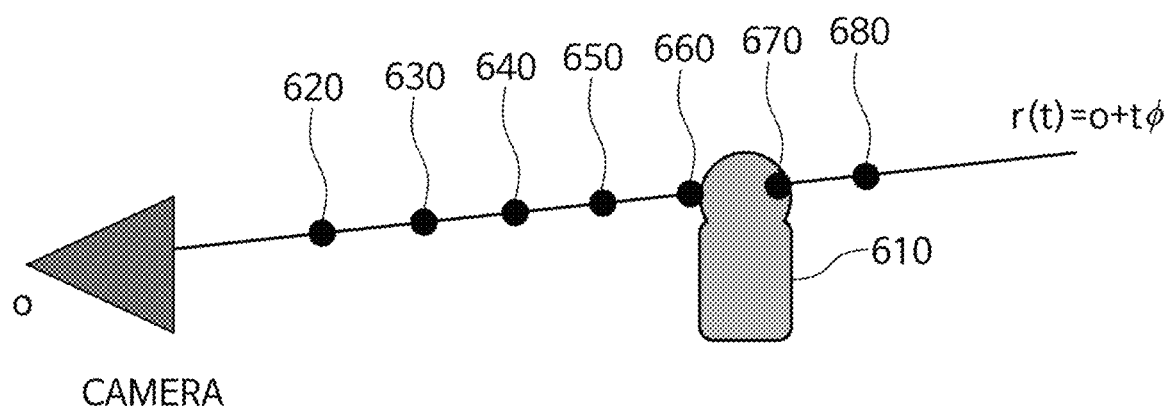
FIG. 6 is a diagram illustrating an example of a method for training a volume estimation model.

FIG. 6 is a diagram illustrating an example of a method for training a volume estimation model. The volume estimation model F may receive the position information x and viewing direction information ϕ in the specific space to infer the color value c and volume density value. For example, the volume estimation model may be expressed by Equation 1 described above. In an embodiment, the volume estimation model may be trained to minimize the difference between the pixel value included in a plurality of images and the estimated pixel value calculated based on the color value and volume density value estimated by the volume estimation model. For example, the loss function for training the volume estimation model may be expressed by Equation 2 described above.

In Equation 2 described above, Ĉ denotes the estimated pixel value calculated based on the color value and volume density value estimated by the volume estimation model, in which the estimated pixel value may be calculated by the following process, for example.

First, the information processing system may assume that a virtual ray (hereinafter, "ray" (optical path), r(t)=o+tϕ) connecting a point (one pixel) on the image plane from the focal center o of a plurality of images obtained by capturing a target object 610. A plurality of sampling points 620, 630, 640, 650, 660, 670, and 680 present along the ray may be extracted. For example, the information processing system may extract the plurality of sampling points 620, 630, 640, 650, 660, 670, and 680 at equal intervals on the ray. The information processing system may input position information and viewing direction information (direction from the sampling point to the focal center) of the plurality of sampling points 620, 630, 640, 650, 660, 670, and 680 to the volume estimation model to infer the color values and volume density values of the corresponding points. Based on the color values and volume density values inferred for the plurality of sampling points 620, 630, 640, 650, 660, 670, and 680, estimated pixel values formed on the image plane (specifically, on the points where the corresponding ray meets the image plane, that is, on the pixels) may be calculated. For example, by calculating color values obtained by accumulating the color values inferred with respect to the plurality of sampling points 620, 630, 640, 650, 660, 670, and 680 in proportion to inferred volume density values, respectively, it is possible to calculate the estimated pixel values formed on the image plane. Specifically, the process of calculating the estimated pixel value based on the color value and volume density value estimated by the volume estimation model may be expressed by Equation 3 below.

$$\hat{C}(r) = \int_{t_n}^{t_f} T(t)\sigma(r(t))c(r(t),\phi)dt, \text{ where, } T(t)=\exp(-\int_{t_n}^{t} \sigma(r(s))ds) \qquad \text{<Equation 3>}$$

where r is the ray, Ĉ(r) is the estimated pixel value that is calculated, $t_n$ and $t_f$ are a near boundary (that is, the nearest point with non-zero volume density), and a far boundary (that is, the furthest point with non-zero volume density), respectively, σ is the volume density value, c is the color value, t and ϕ are the position information and viewing direction information of the sampling point, respectively, and T(t) is the cumulative transmittance from $t_n$ to t (that is, the probability that ray (light) can travel from $t_n$ to t without hitting any other particles). The process of calculating such estimated pixel values may be performed with respect to all pixels in the plurality of images.

The volume estimation model may be trained to minimize a difference between the estimated pixel values calculated based on the estimated color values and volume density values and the pixel values included in the real image. As a specific example, the loss function for training the volume estimation model may be expressed by Equation 4 below.

$$\text{Loss} = \sum_{r \in R} \|\hat{C}(r) - C(r)\|_2^2 \qquad \text{<Equation 4>}$$

where, r is a ray, R is a set of rays for a plurality of images, and C(r) and Ĉ(r) are the ground truth pixel value with respect to each ray, and the estimated pixel values calculated based on the color values and volume density values estimated by the volume estimation model.

Additionally or alternatively, the information processing system may extract the plurality of sampling points 620, 630, 640, 650, 660, 670, and 680 present along the ray, and perform a process of calculating estimated pixel values a plurality of times. For example, the information processing system may perform a hierarchical volume sampling process. Specifically, instead of using one volume estimation model, it may use two models, i.e., a coarse model and a fine model. First, according to the method described above, color values and volume density values output from the coarse model may be inferred. Using the output value of the coarse model, it is possible to extract more sampling points from a portion where it is estimated that the target object 610 (specifically, the surface of the target object, for example) is present, and extract fewer sampling points from a portion where it is estimated that the target object 610 is not present, thereby training a fine model. In this example, the loss function for training the fine model may be expressed by Equation 5 below.

$$\text{Loss} = \sum_{r \in R} \left[ \|\hat{C}_c(r) - C(r)\|_2^2 + \|\hat{C}_f(r) - C(r)\|_2^2 \right] \qquad \text{<Equation 5>}$$

where, R may denote a set of rays for a plurality of images, and, $\hat{C}_c(r)$, and $\hat{C}_f(r)$ may denote a ground truth pixel value for ray, an estimated color value based on the coarse model, and an estimated color value based on the fine model, respectively. Finally, a 3D model of the target object 610 may be generated by using the trained fine model.

Additionally or alternatively, instead of estimating the volume density directly, it is possible to express the volume density on the ray with a signed distance function (SDF) to improve the accuracy of estimation of the surface position of the target object 610. For example, the volume density may be modeled as a variant of a learnable SDF. Specifically, the volume density may be modeled by Equation 6 below.

$$\sigma(x) = \alpha \psi_\beta(-d_\Omega(x)) \qquad \text{<Equation 6>}$$

where, $d_\Omega(x) = (-1)^{1_\Omega(x)} \min_{y \in M} \|x - y\|_2$, $$\psi_\beta(s) = \begin{cases} \frac{1}{2}\exp\left(\frac{s}{\beta}\right), & \text{if } s \leq 0 \\ 1 - \frac{1}{2}\exp\left(-\frac{s}{\beta}\right), & \text{if } s > 0 \end{cases}$$

where σ(x) is the volume density function, are learnable parameters, $\psi_\beta$ is the Cumulative Distribution Function (CDF) of the Laplace distribution with zero mean and a scale parameter of β, Ω is the area occupied by the target object, $M$ (=∂Ω) is the boundary surface of the target object, $1_\Omega$ is a function that is 1 if the point x is within the area occupied by the target object, or 0 otherwise, $d_\Omega$ is a function of which value changes according to the distance to the boundary surface, while having a positive value if the point x is within the area occupied by the target object, or a negative value otherwise.

In this case, the loss function for training the volume estimation model may be defined based on the color loss and the Eikonal loss. In this case, the color loss may be calculated similarly to the method described above (e.g., Equation 2, Equation 4, or Equation 5), and the Eikonal loss is a loss representing a geometric penalty. Specifically, the loss function may be defined by Equation 7 below.

$$\mathcal{L} = \mathcal{L}_{RGB} + \lambda \mathcal{L}_{SDF} \qquad \text{<Equation 7>}$$

where, $\mathcal{L}$ is the total loss, $\mathcal{L}_{RGB}$ is the color loss, $\mathcal{L}_{SDF}$ is the Eikonal loss, and $\lambda$ is a hyper-parameter (e.g., 0.1).

As described above, the information processing system may train the volume estimation model according to various methods, and generate a 3D model by using the trained volume estimation model.

Figure 7:
FIG. 7 is a diagram illustrating an example of comparing a 3D model generated by a method for generating an XR object according to an example and a 3D model generated by a related method.
Figure 7:
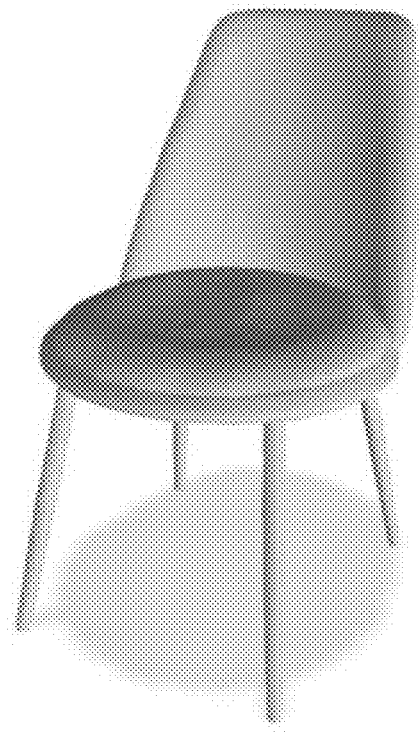

FIG. 7 is a diagram illustrating an example of comparing a 3D model 720 generated by a method for generating an XR object according to an example and a 3D model 710 generated by a related method. According to the related method, the feature points may be extracted from the image obtained by capturing a target object, and the position values of the feature points in a 3D space may be estimated. In this case, the feature point may mean a point that can be estimated as the same point in a plurality of images. A depth map for the 3D shape, or a point cloud may be generated based on the position values of the estimated feature points and a 3D mesh for the target object may be generated based on the depth map or the point cloud.

However, if the 3D model is generated according to the related method, depending on the features of the target object, the shape of the object may not be properly reflected. For example, in the case of an object (e.g., solid-colored plastic, metal, and the like) having a texture for which it is difficult to specify the feature points, considerably fewer feature points may be extracted and the shape of the object may not be properly reflected in the 3D model. As another example, in the case of an object having a reflective or transparent material, the feature point may be extracted from a different position from the real object due to reflection or refraction of light, or the feature points may be extracted from several different points but these are actually the same point in the real object, in which case a 3D model with an abnormal shape and texture may be generated. As another example, if a thin and fine portion is included in the object, there may not be a sufficiently large area of the feature points distribution to specify a surface in the corresponding portion, and the portion may be recognized as a point rather than surface and omitted in the step of generating the 3D mesh. As described above, depending on the features of the target object, the related method may not be able to properly generate the 3D model.

An example of the 3D model 710 generated by the related method is illustrated in FIG. 7. As illustrated, since the 3D model 710 generated by the related method does not accurately reflect the surface position of the real target object, there is a problem in that the surface is not smooth and some portions are omitted.

In contrast, according to the method for generating an XR object according to an embodiment, the volume estimation model is used instead of extracting the feature points from the image, and as a result, it is possible to estimate the color values and volume density values for all points in a specific space in which the object is positioned, thereby generating a 3D model that more accurately reflects the real target object.

An example of the 3D model 720 generated by the method according to one aspect is illustrated in FIG. 7. As illustrated, the 3D model 720 generated by the method according to one aspect may more precisely and accurately reflect the shape or texture of the real target object. Accordingly, according to the method of the present disclosure, it is possible to generate a high-quality 3D model close to the photorealistic quality.

Figure 8:
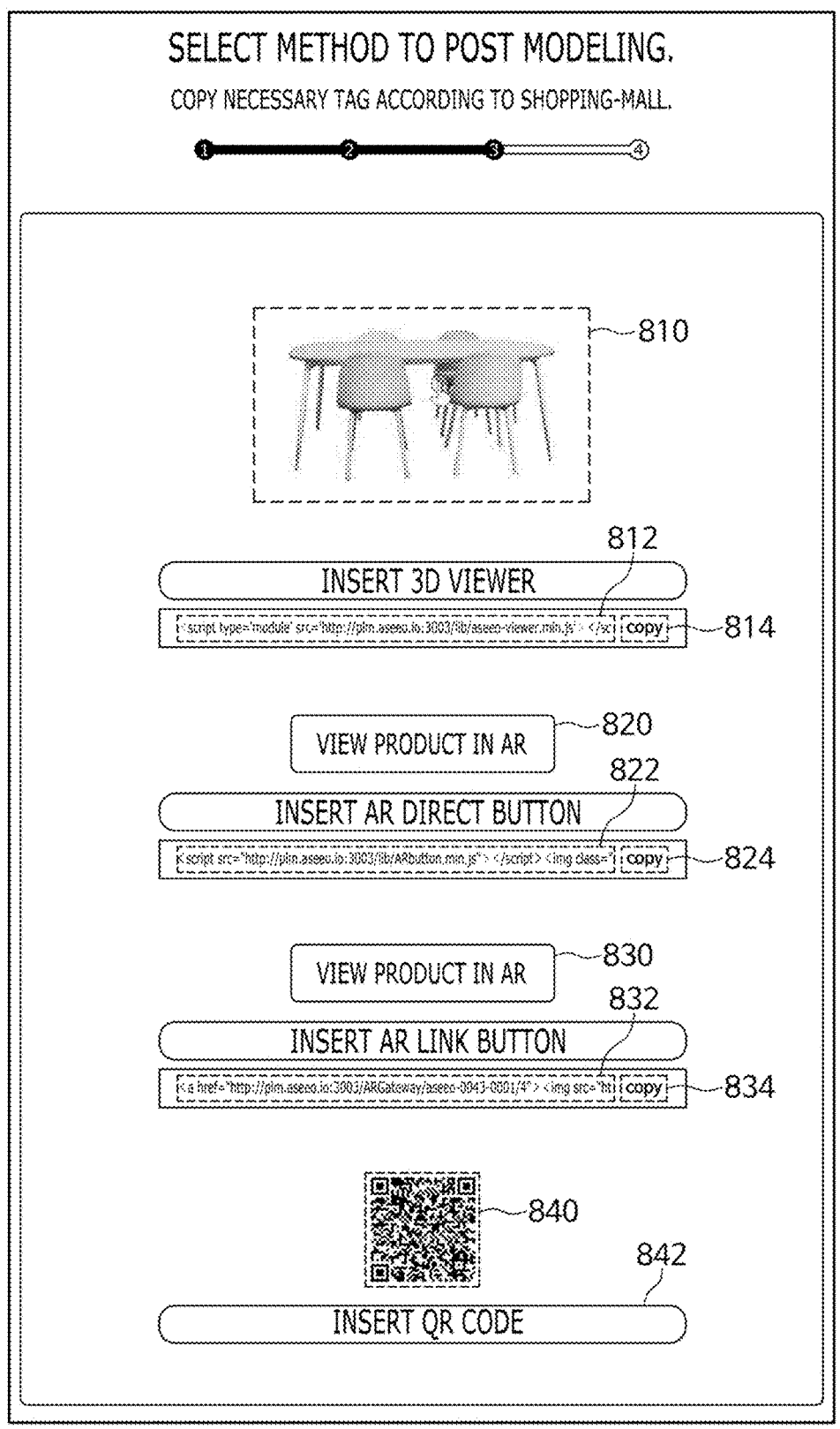
FIG. 8 is a diagram illustrating an example in which the information processing system transmits, to a first user terminal, a code for applying an XR object to an online platform.

FIG. 8 is a diagram illustrating an example in which the information processing system transmits codes 812, 822, 832, and 840 for applying an XR object to an online platform to the first user terminal. The information processing system may generate a code for applying the XR object of the target object to the online platform and transmit the generated code to the first user terminal. In this example, the code for applying the XR object to the online platform may refer to a code applied to the online platform to allow the user terminal accessing the online platform to perform tasks associated with the XR object, such as viewing XR objects, outputting XR objects, and the like. For example, the code for applying the XR object to the online platform may include a code for outputting a preview of the XR object to a second user terminal (e.g., a user terminal and the like of the online platform) connected to the online platform, a code for outputting a button, link, and the like for viewing the XR object or preview of the XR object to the second user terminal, a code for outputting a visually coded pattern (e.g., a QR code) for viewing the XR object or the preview of the XR object or a visually coded pattern to the second user terminal, and the like. In this case, the code may refer to a code written in a language applicable to the online platform. For example, if the online platform is a web-based platform, the code may include a code written in a language such as Javascript or the like, a binary of the code, an HTML, tag for loading the code, and the like. As another example, if the online platform is a platform in augmented reality, it may include software produced in the form of a plug-in or the like that can load XR objects on the corresponding platform. The first user terminal receiving the code may output the received code on the display.

An example in which the first user terminal outputs the received code on the display is illustrated in FIG. 8. For example, the first user terminal may receive a code 812 for outputting a preview 810 of a 3D model and output the received code on the display. The first user (e.g., the operator or manager of the online platform) may select a copy button 814 near the code 812 for outputting the preview 810 of the 3D model to copy the corresponding code 812 and apply the copied code to the online platform. The second user (e.g., the user of the online platform) may access, through the second user terminal, the online platform to which the code 812 for outputting the preview 810 of the 3D model is applied and view the 3D model. In addition, the second user may control the 3D model output on the second user terminal by touching, swiping, dragging and dropping, and the like to rotate the 3D model in a desired direction, thereby viewing the 3D model of the target object in any direction.

Additionally or alternatively, the first user terminal may receive the codes 822 and 832 for outputting an AR direct button 820 or an AR link button 830 and output the received codes on the display. The first user may select copy buttons 824 and 834 near the codes 822 and 832 for outputting the AR direct button 820 or the AR link button 830, so as to copy the corresponding codes 822 and 832 and apply the copied code to the online platform. The second user may access, through the second user terminal, the online platform to which codes 822 and 832 for outputting the AR direct button 820 or the AR link button 830 are applied, and experience the XR object.

Additionally or alternatively, the first user terminal may receive a QR code 840 for viewing the XR object or the preview of the XR object, or a code for outputting the same, and output the received code on the display. The first user may copy the QR code 840 or the code for outputting the same and apply the code to the online platform. The second user may connect the second user terminal to the online platform to which the QR code 840 for viewing the XR object or the preview of the XR object or the code for outputting the same is applied and capture the QR code using the user terminal equipped with a camera (or image sensor, and the like) to experience the XR object.

As described above, the information processing system may generate a high-quality XR object and provide a code for applying the XR object to the online platform, and accordingly, without having to develop separate software for providing the XR objects, the operator or manager of the online platform can provide the end user with the user experience of experiencing the XR object by applying the provided code to the online platform.

Figure 9:
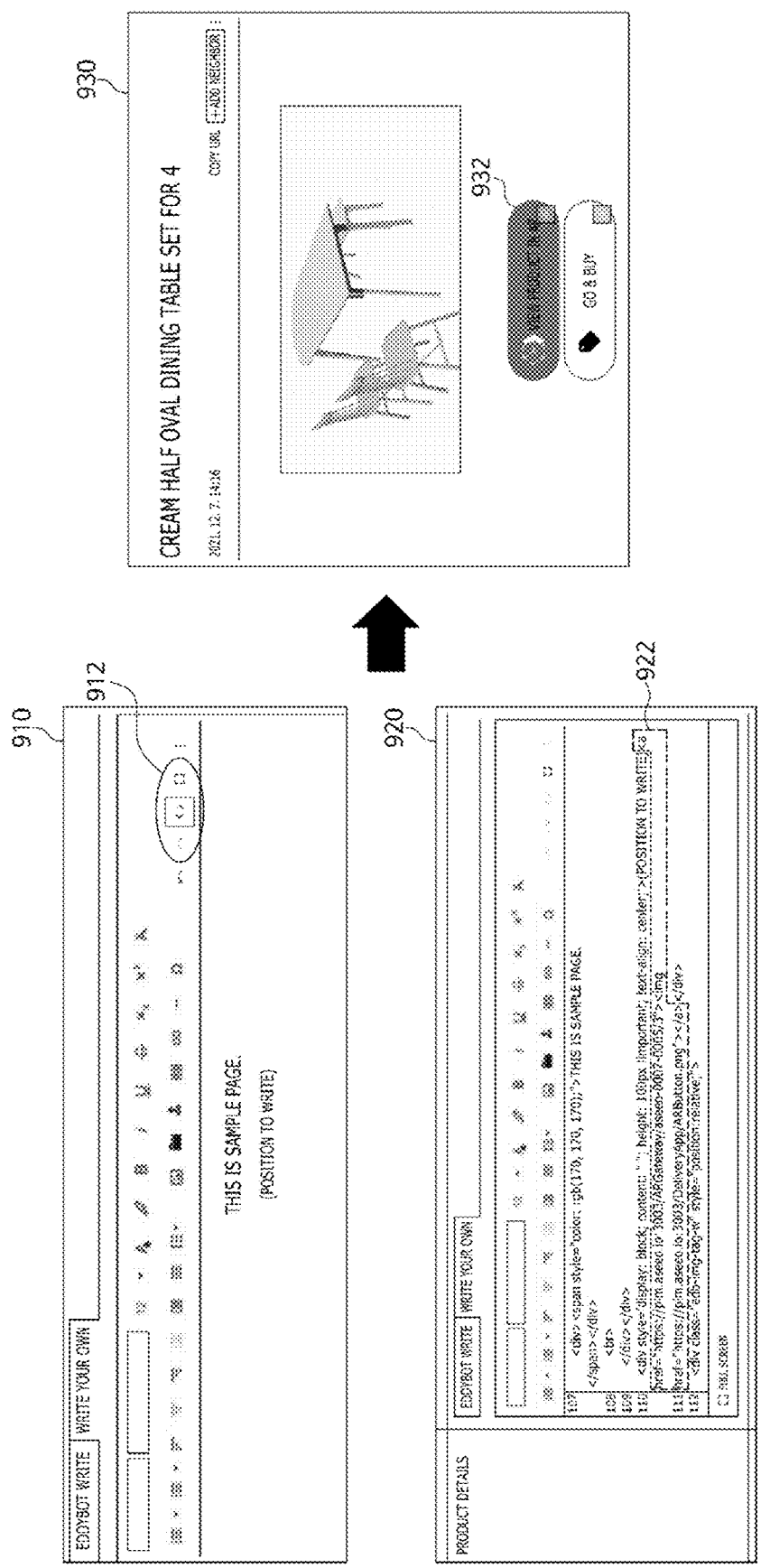
FIG. 9 is a diagram illustrating an example of applying a code to an online platform.

FIG. 9 is a diagram illustrating an example of applying a code to the online platform; On an edit screen 910 for posting a post on the online platform output through the first user terminal, the first user (e.g., an operator or manager of the online platform) may select a code view button 912 to switch the screen to a code editing screen 920. The first user may apply the code to the online platform by inputting or pasting a code 922 (in the example shown, the code for outputting the AR link button) for applying the XR object to the online platform at a position on the code editing screen 920 where writing is desired. For example, an online platform 930 to which the code for outputting an AR link button is applied may include an AR link button 932. In this case, the second user (e.g., an end user of the online platform) may access, through the second user terminal, the online platform 930 to which the code for outputting the AR link button is applied and select the AR link button 932 to experience the XR object.

Figure 10:
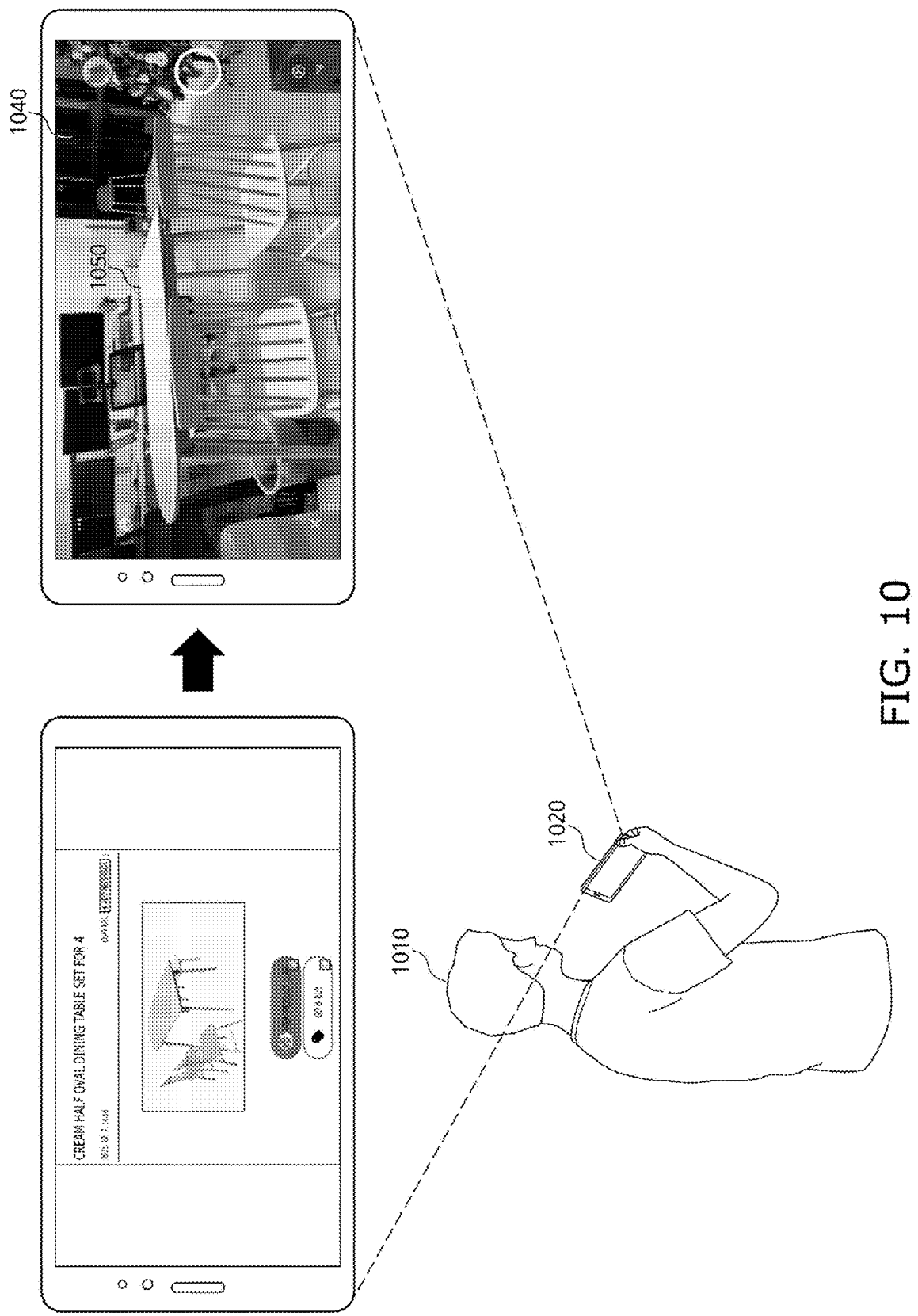
FIG. 10 is a diagram illustrating an example in which a user experiences an XR object.

FIG. 10 is a diagram illustrating an example in which a user 1010 experiences an XR object 1050. The user 1010 (e.g., an end user of the online platform) may use a user terminal 1020 to experience the XR object 1050. For example, the user 1010 may use the user terminal 1020 to access the online platform to which a code for outputting an AR link button 1030 is applied, and select the AR link button 1030 to experience the XR object 1050. Specifically, in response to the input of the user 1010 selecting the AR link button 1030, the user terminal 1020 may transmit a request to view the XR object 1050 to the information processing system and the information processing system may transmit data for outputting the XR object 1050 requested for viewing to the user terminal 1020. The user terminal 1020 may use the received data for outputting the XR object 1050 to virtually place the XR object 1050 on the image of a real space 1040 captured by the camera (or image sensor, and the like) and display the result on the display. Through this, it is possible to provide the user experience such that the user 1010 feels as if the target object is disposed in the real space 1040 captured by the camera, which helps the user decide whether or not to purchase the product.

Figure 11:
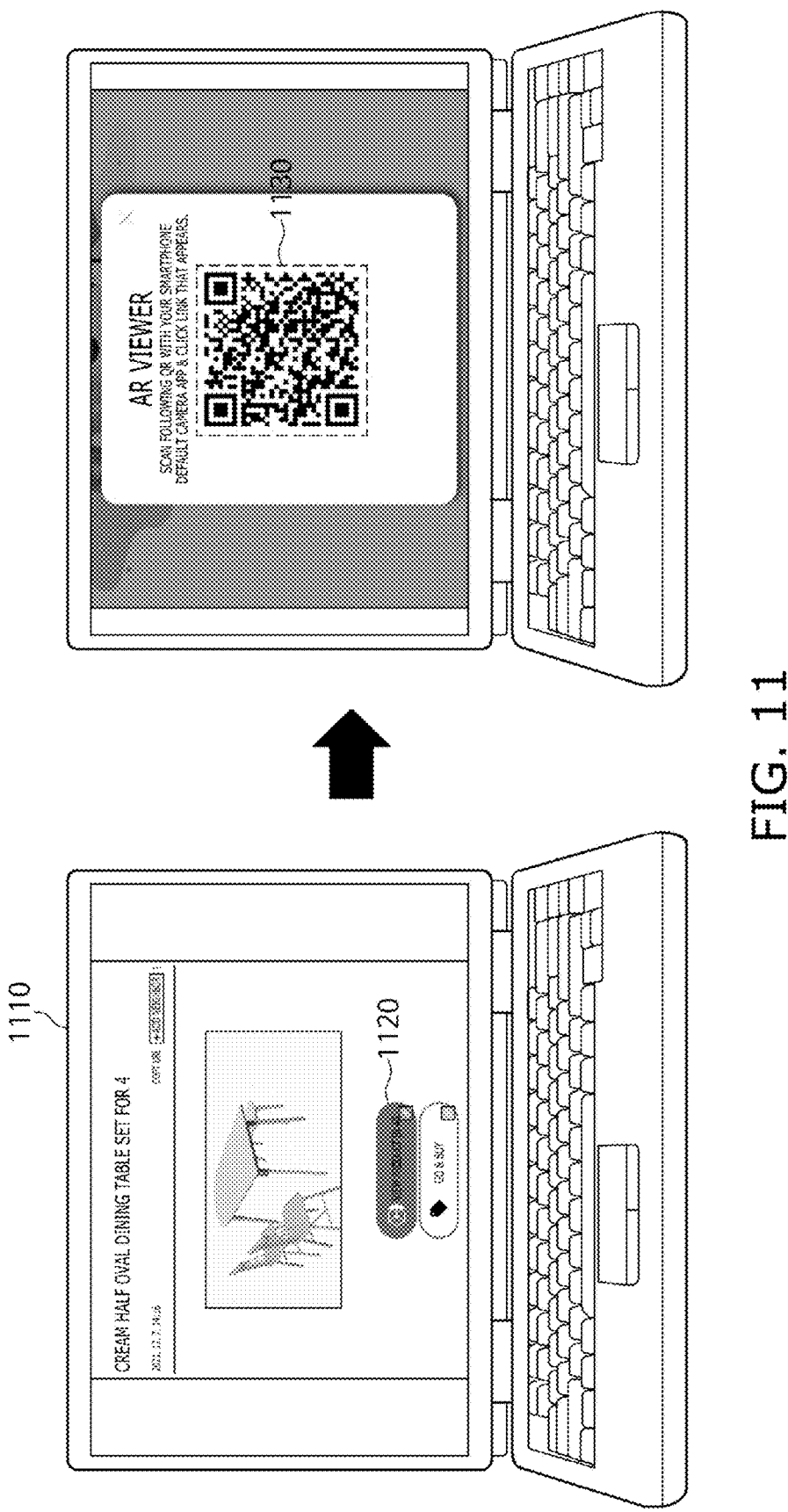
FIG. 11 is a diagram illustrating an example of switching a device to experience an XR object.

FIG. 11 is a diagram illustrating an example of switching a device to experience an XR object. The end user of the online platform may access, through a first user terminal 1110, the online platform to which the code is applied and request to view the XR object. In this example, if the first user terminal 1110 is a type of device that does not support XR object experience, it is possible to switch to a device that supports XR object experience to experience the XR object.

For example, the user may select an AR link button 1120 included in the online platform to transmit a request to view the XR object to the information processing system, and the information processing system may receive, from the first user terminal 1110, a first request to view the XR object through the online platform to which the code is applied, and in response, determine whether or not it is necessary to switch the device to view the XR object. For example, the information processing system may check the device information of the first user terminal 1110 that transmitted the first request to view, or check the information on a path and protocol through which the first user terminal 1110 transmitted the first request to view, the information on a program, an application, a browser used by the end user to access the online platform, and the like, thereby determining whether or not it is necessary to change the device to view the XR object. As another example, the information processing system may receive, through the first user terminal 1110, a user input for selecting whether or not it is necessary to change the device to view the XR object, and thus determine whether or not it is necessary to change the device.

If it is determined that it is necessary to change the device, the information processing system may transmit a visually coded pattern 1130 (e.g., QR code) for viewing the XR object to the first user terminal 1110, and the first user terminal 1110 may output the code on the display. By capturing the visually coded pattern 1130 output through the display of the first user terminal 1110 with a second user terminal (e.g., mobile phone) that supports XR object experience, the end user may transmit a second request to view the XR object. Upon receiving the second request to view from the second user terminal, the information processing system may transmit data for outputting the XR object through the second user terminal to the second user terminal, and the end user may experience the XR object using the second user terminal.

Figure 12:
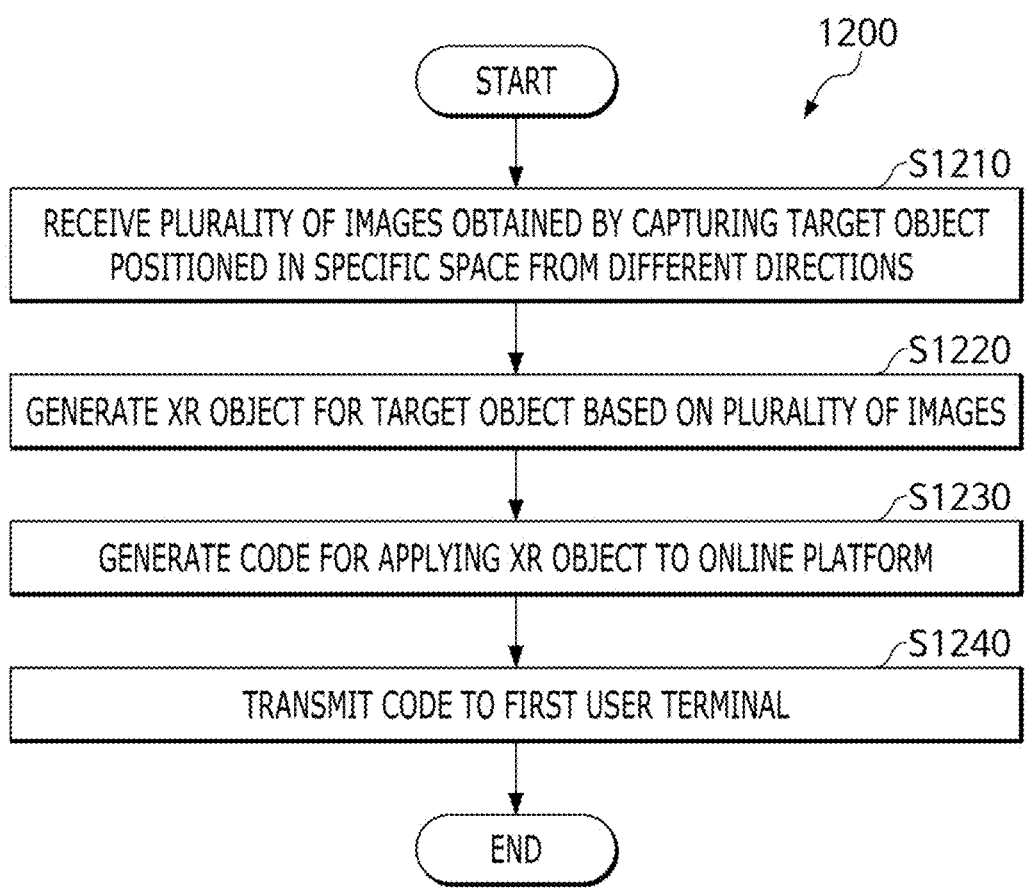
FIG. 12 is a flowchart illustrating an example of a method for providing an XR object.

FIG. 12 is a flowchart illustrating an example of a method 1200 for providing an XR object. It should be noted in advance that the flowchart of FIG. 12 and the description provided below with reference to FIG. 12 are merely exemplary, and other embodiments may be implemented with various modifications.

The method 1200 may be initiated by the processor (e.g., one or more processors of the information processing system) receiving a plurality of images that are obtained by capturing a target object positioned in a specific space from different directions, at S1210. For example, the processor may be configured to receive from the user terminal a video of the target object captured while rotating around the same, and acquire a plurality of images from the video.

The processor may be configured to generate an XR object for the target object based on the plurality of images, at S1220. The XR object for the target object may be a digital object including 3D information on the target object. For example, the XR object may include a 3D model of the target object, and additionally include a description of each part of the target object, a moving 2D/3D animation, or the like.

For example, in order to generate an XR object for the target object, first, the processor may be configured to estimate the position and pose of capturing each image. In this case, the "position and pose of capturing each image" may refer to the position and direction of the camera at the time point of capturing each image. In order to estimate the position and pose, various estimation methods for estimating the position and pose from the image may be used. For example, a photogrammetry technique of extracting feature points from a plurality of images and use the extracted feature points to estimate the position and pose of capturing each image may be used, but aspects are not limited thereto, and various methods for estimating the position and pose may be used.

The processor may train the volume estimation model based on the plurality of images and the position and pose of capturing each image. The volume estimation model may be a model trained to receive position information and viewing direction information in a specific space and output color values and volume density values. Further, the volume estimation model may be trained to minimize a difference between a pixel value included in a plurality of images and an estimated pixel value calculated based on the color value and volume density value estimated by the volume estimation model.

The processor may use the volume estimation model to generate a 3D model of the target object. For example, the processor may use the volume estimation model to generate a 3D depth map of the target object, generate a 3D mesh of the target object based on the generated 3D depth map, and apply texture information on the 3D mesh to generate a 3D model of the target object. The 3D depth map of the target object may be generated based on the volume density values at a plurality of points in the specific space inferred by the volume estimation model. In addition, the texture information may be determined based on the color values at a plurality of points and plurality of viewing directions in the specific space inferred by the volume estimation model.

Additionally or alternatively, the processor may estimate a camera model, use the estimated camera model to transform the distorted image into undistorted image, and perform the process described above. For example, the processor may estimate the camera model based on the plurality of images, use the estimated camera model to transform the plurality of images into a plurality of undistorted images, and train the volume estimation model by using the transformed plurality of undistorted images. In this case, the estimated position and pose of capturing each image may be transformed using the camera model, or the position and pose of capturing each image may be estimated using the undistorted image. The processor may generate a 3D depth map of the target object using the volume estimation model trained based on the undistorted image, and, using the camera model, transform the 3D depth map back to the 3D depth map for the distorted image. The processor may generate a 3D mesh of the target object based on the transformed 3D depth map, and apply the texture information on the 3D mesh to generate a 3D model of the target object.

The processor may generate a code for applying the generated XR object to the online platform, at S1230. The code for applying the XR object to the online platform 130 may refer to a code applied to the online platform 130 so as to allow a user terminal accessing the online platform 130 to perform tasks associated with the XR object, such as viewing XR objects, outputting XR objects, and the like. For example, the code for applying the XR object to the online platform 130 may include a code for outputting a preview of the XR object to a second user terminal 140 (e.g., the terminal of the user of the online platform 130, and the like) connected to the online platform 130, and a code for outputting an XR object or a button, a link, a visually coded pattern (e.g., QR code), or the like for viewing the preview of the XR object to the second user terminal 140. The code may refer to a code written in a language applicable to the online platform 130. For example, if the online platform 130 is a web-based platform, the code may include a code written in a language such as Javascript or the like, a binary of the code, an HTML tag for loading the code, and the like. As another example, if the online platform 130 is a platform in augmented reality, it may include software produced in the form of a plug-in or the like that can load XR objects on the corresponding platform.

The processor may transmit the generated code to the first user terminal, at S1240. The first user terminal may be a user terminal (e.g., a terminal of an operator or manager of the online platform) requesting to generate an XR object for the target object.

Additionally, the processor may receive, from a second user terminal (e.g., a terminal of a user of the online platform), a first request to view the XR object through the online platform to which the code is applied, and transmit data associated with the XR object to the second user terminal. The second user terminal receiving the data associated with the XR object may use the data associated with the XR object to virtually place the XR object on an image of a real space capture by the camera or on an image of a virtual space and display the result on the display.

Additionally or alternatively, the processor may receive, from the second user terminal, the first request to view the XR object through the online platform to which the code is applied, and in response, determine whether or not it is necessary to change the device to view the XR object. In response to determining that it is necessary to change the device, the processor may transmit a visually coded pattern for viewing the XR object to the second user terminal, and receive a second request to view the XR object from the third user terminal that captured the visually coded pattern. The processor may transmit the data associated with the XR object to the third user terminal.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce, while discs optically play back data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for providing an extended Reality (XR) object, the method executed by one or more processors and comprising:

receiving a plurality of images obtained by capturing a target object positioned in a specific space from different directions;

generating an XR object for the target object based on the plurality of images;

generating a code for applying the XR object to an online platform;

transmitting the code to a first user terminal;

receiving, from a second user terminal, a first request to view the XR object through the online platform to which the code is applied;

in response to receiving the first request to view the XR object, determining whether or not it is necessary to change a device to view the XR object;

in response to determining that it is necessary to change the device, transmitting a visually coded pattern for viewing the XR object to the second user terminal; and receiving a second request to view the XR object from a third user terminal that captured the visually coded pattern.

2. The method according to claim 1, further comprising:
receiving, from a second user terminal, a first request to view the XR object through the online platform to which the code is applied; and
transmitting data associated with the XR object to the second user terminal.

3. The method according to claim 2, wherein the XR object is a digital object including 3D information on the target object, and
the second user terminal uses data associated with the XR object to virtually place the XR object on an image of a real space captured by a camera or on an image of a virtual space and display the XR object on the image of the real space or on the image of the virtual space on a display.

4. The method according to claim 1, wherein the generating the XR object for the target object includes:
estimating a position and a pose of capturing each of the plurality of images;
training a volume estimation model based on the plurality of images and the position and the pose of capturing each of the plurality of images; and
generating a 3D model of the target object by using the volume estimation model.

5. The method according to claim 4, wherein the volume estimation model is a model trained to be inputted with position information and viewing direction information on the specific space and output color values and volume density values.

6. The method according to claim 4, wherein the volume estimation model is trained to minimize a difference between pixel values included in the plurality of images and estimated pixel values calculated based on color values and volume density values estimated by the volume estimation model.

7. The method according to claim 4, wherein the generating the 3D model of the target object includes:

generating a 3D depth map of the target object by using the volume estimation model;
generating a 3D mesh of the target object based on the generated 3D depth map; and
applying texture information on the 3D mesh to generate the 3D model of the target object.

8. A non-transitory computer-readable recording medium storing instructions that, when executed by one or more processors, cause performance of the method according to claim 1.

9. An information processing system, comprising:
a communication module;
a memory; and
one or more processors connected to the memory and configured to execute one or more computer-readable programs included in the memory, wherein
the one or more programs include instructions for:
receiving a plurality of images obtained by capturing an image of a target object positioned in a specific space from different directions;
generating an XR object for the target object based on the plurality of images;
generating a code for applying the XR object to an online platform;
transmitting the code to a first user terminal;
receiving, from a second user terminal, a first request to view the XR object through the online platform to which the code is applied;
in response to receiving the first request to view the XR object, determining whether or not it is necessary to change a device to view the XR object;
in response to determining that it is necessary to change the device, transmitting a visually coded pattern for viewing the XR object to the second user terminal; and
receiving a second request to view the XR object from a third user terminal that captured the visually coded pattern.

* * * * *